United States Patent

[11] 3,599,339

[72] Inventor Edward S. Adamczyk
 47 Mazarin St., Indian Orchard, Mass. 01051
[21] Appl. No. 846,060
[22] Filed July 30, 1969
[45] Patented Aug. 17, 1971

[54] MEASURING APPARATUS
 3 Claims, 7 Drawing Figs.
[52] U.S. Cl. .................................................. 33/172
[51] Int. Cl. ....................................................... G01b 3/22,
 G01b 5/00, G01b 3/32
[50] Field of Search ........................................... 33/169, 172
 R, 172 B, 170; 248/124, 125, DIG. 4

[56] References Cited
 UNITED STATES PATENTS
 2,240,536 5/1941 Woxen ......................... 33/172

Primary Examiner—Leonard Forman
Assistant Examiner—A. J. Mirabito
Attorneys—Kenwood Ross and Chester E. Flavin ABSTRACT: Measuring apparatus, cooperant with a platform having a post extendable vertically upwardly thereof, in the form of a clamping device slideable and rotatable on and relative to the post and including, first, a body sleeved in friction fit relation on the post and, second, a ring vertically spaced from and vertically below the body and sleeved in loose fit relation on the post and, third, a vertically extending yieldable reed connecting between the body and ring and normally spaced outwardly from the post and, fourth, an arm extending radially and outboard of the ring, and a screw means threadedly engaged in the ring diametrically opposite to the reed and in axial alignment with the arm with a manual adjusting of the screw means creating a pulling force on the ring such as to produce a slight deflection downwardly of the ring and arm as the reed pivots with respect to the body.

PATENTED AUG 17 1971

INVENTOR.
EDWARD S. ADAMCZYK
BY Kenwood Ross &
Chester E. Flavin
ATTORNEYS.

MEASURING APPARATUS

SUMMARY OF THE INVENTION

The invention provides a simple, inexpensive measuring apparatus for use with an indicating device for determining the dimensions of a workpiece or comparing the dimensions of workpieces.

The invention is directed particularly to height gauges or apparatus for measuring or comparing the measurements of objects and to "go" and "no go" gauges for gauging stamped or milled metal parts.

The conventional height gauge, which is an expensive tool and cumbersome to set up and operate, may be a micrometer-type gauge or may involve a graduated dial gauge having an operating plunger actuated through a lever mechanism that engages the part whose height is to be gauged. If the part being gauged has several different surfaces at different heights, respectively, from its base, or has several different holes, the height of each of which has to be measured, or whose distance from one another has to be gauged, several different setups of the height gauge are required, and the measurement and computation become time consuming. Heights may also be gauged with precision measuring blocks, or with such blocks used in conjunction with a surface gauge. None of these methods lends itself particularly well to production work.

Herewith, to measure the height of a surface, a microgauge is engaged with a gauge member and set, and is then swung to engage the surface, whose height is to be measured, to compare the height of that surface with the height of the gauge member.

The invention provides a gauge or comparator which may be used for setting conventional dial gauges quickly and easily so as to gauge the heights of parts in production quantities.

It provides a comparator for use in accurately and quickly setting gauges to measure the heights of a plurality of parts which are, respectively, at different heights.

It provides a comparator which itself requires no checking or calibration, but which can readily be preset accurately with Johansson blocks, or similar precision measuring means, so as to be usable quickly and precisely for setting a conventional gauge to gauge the heights of various parts.

The comparator can be used for repetitive checking of the gauges used in gauging the heights of a plurality of different surfaces that are, respectively, at different heights.

DESCRIPTION OF THE PREFERRED EMBODIMENT

A base or platform 10 is provided which may serve as a support for the apparatus and may also serve as a table for supporting objects, such as a workpiece W, for purposes of measurement or comparison.

A column or post or spindle 12 extends vertically upwardly from base 10 and is rigidly secured thereto as by being mounted with a press fit in an opening at one side of the base. While the column or post is shown as being cylindrical in form, it may be otherwise shaped.

Figure 1:
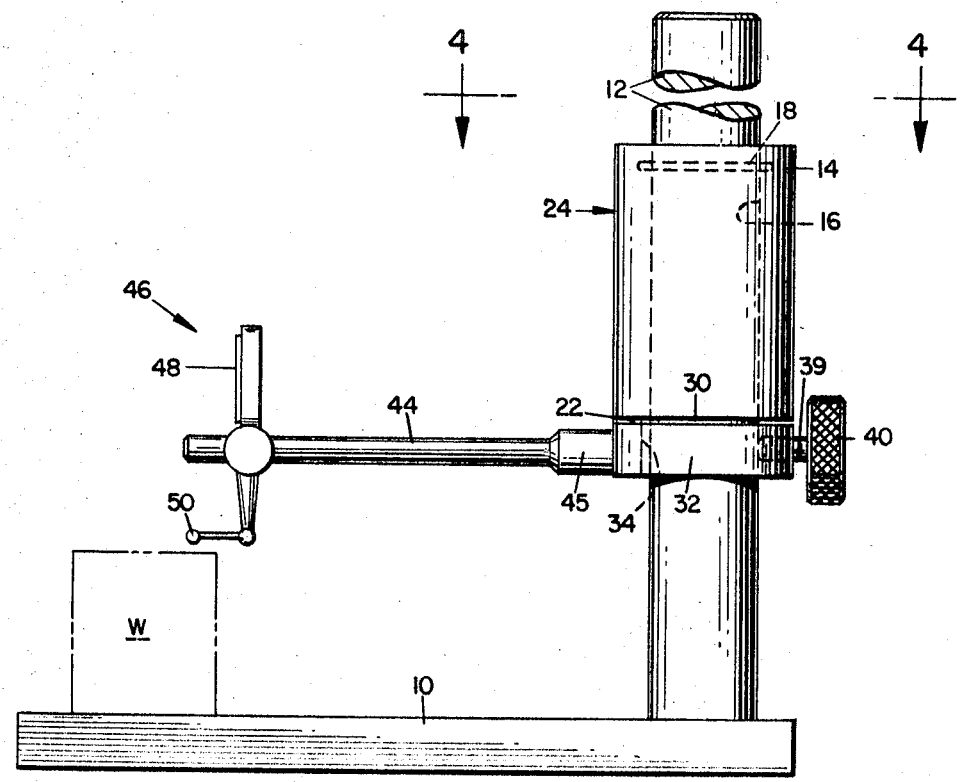
FIG. 1 is a broken view, in side elevation, of measuring apparatus embodying the novel features of the invention and illustrating its use in setting and checking the position of a standard dial gauge so that the gauge may be used in gauging height.
Figure 2:
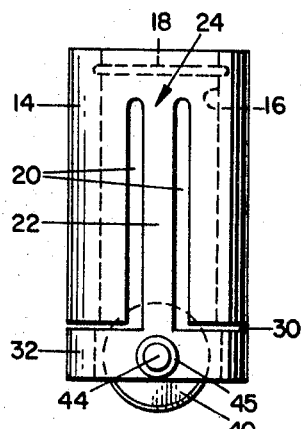
FIG. 2 is a view, in front elevation, of the clamping device of the apparatus of the invention.
Figure 3:
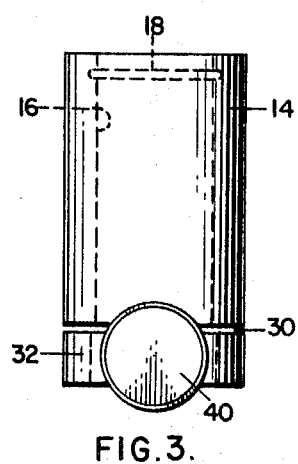
FIG. 3 is a view, in rear elevation, of the clamping device of FIG. 2.
Figure 4:
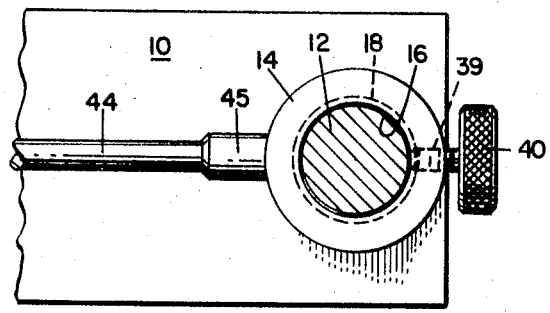
FIG. 4 is a fragmentary, cross-sectional view taken on line 4-4 of FIG. 1.
Figure 5:
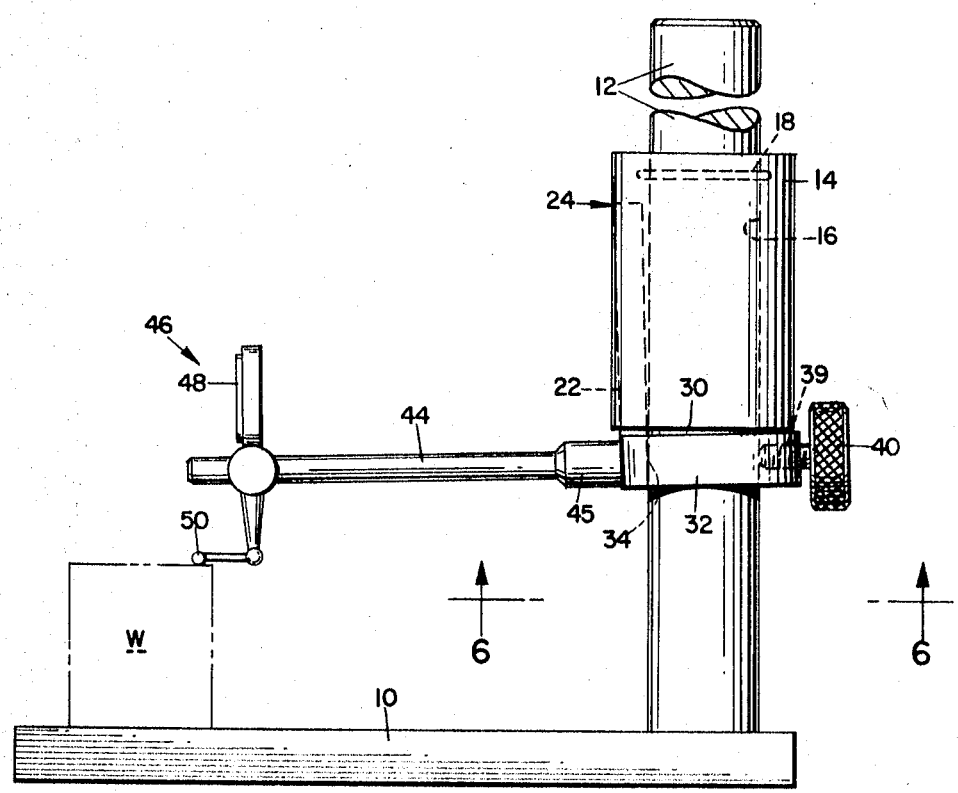
FIG. 5 is a view, similar to FIG. 1, showing the relationship of the components in the clamping position.
Figure 6:
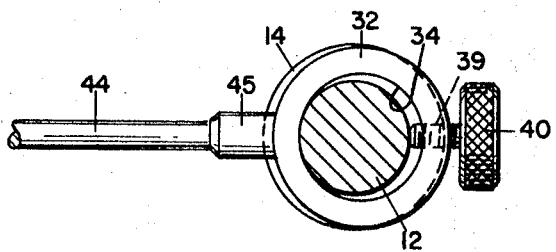
FIG. 6 is a fragmentary, cross-sectional view taken in line 6-6 of FIG. 5.

The column or post, which may be of any suitable height, may carry one or more clamping or positioning means which are slidably and rotatably and removably mounted thereupon. In FIG. 1, and in the other Figures hereof, one such clamping or positioning means is shown and will be understood to include a cylindrical body 14 which is provided with a through-bore 16 of a diameter only slightly larger than the outside diameter of column or post 12 so as to circumscribe and be freely slidable along and rotatable on the column.

An O-ring 18 may be so seated in a suitable recess within through-bore 16 of body 14 adjacent the upper end thereof as to provide a tight interfit between column and clamping or positioning means.

Body 14 is split vertically by a pair of spaced, parallel slots 20, 20 at one side thereof, which slots between them define a longitudinally extending reed or tongue 22 which merges at 24 into the body adjacent the upper end thereof.

Further, the body is split horizontally by a slot 30, which slot is arranged circumferentially of the clamping means and is disposed slightly upwardly of the lower end thereof. Slot 30 communicates with each of the slots 20 and defines an annular, ringlike, lower portion 32 which is fixed to the lower end of reed or tongue 22.

The internal diameter 34 of ringlike lower portion 32 is larger than the outside diameter of column 12 and also larger than the inside diameter 16 of body 14.

Tongue 22 is a relatively yieldable component and acts in a springlike manner to connect ringlike lower portion 32 to body 14.

At a side of the clamping or positioning means diametrically opposite from reed or tongue 22, the stem 39 of horizontally extending thumbscrew 40 is threadedly engaged in a provided opening in ringlike lower portion 32, the inner end of the stem bearing on column 12 for purposes to be described.

Vertically below tongue 22, an arm 44 projects horizontally outwardly from a boss 45 on lower portion 32 so as to be spaced above and in generally parallel relation to base 10.

At the free end of arm 44, an indicating device, generally indicatedly 46 is mounted. The indicating device may be any of the several well-known and commercially available types commonly used for making measurements and normally includes a dial indicator 48 and a contact member in the form of a feeler 50 operatively connected to the dial indicator so that movements of the contact member are indicated on the dial indicator, with slight movements being represented by a considerable arc of movement of the finger in the dial indicator.

When a dial indicator is associated with arm 44, it is possible to measure or compare one object with another object, such as a certain standard, both of which may be supported on base 10. The lever or contact member of an indicator, when it is attached to arm 44, is used to contact the objects.

Clockwise rotation of thumbscrew 40 brings the end of stem 39 into bearing relation with column 12 to lock the clamping means in any desired position of vertical adjustment relative to the column.

Figure 7:
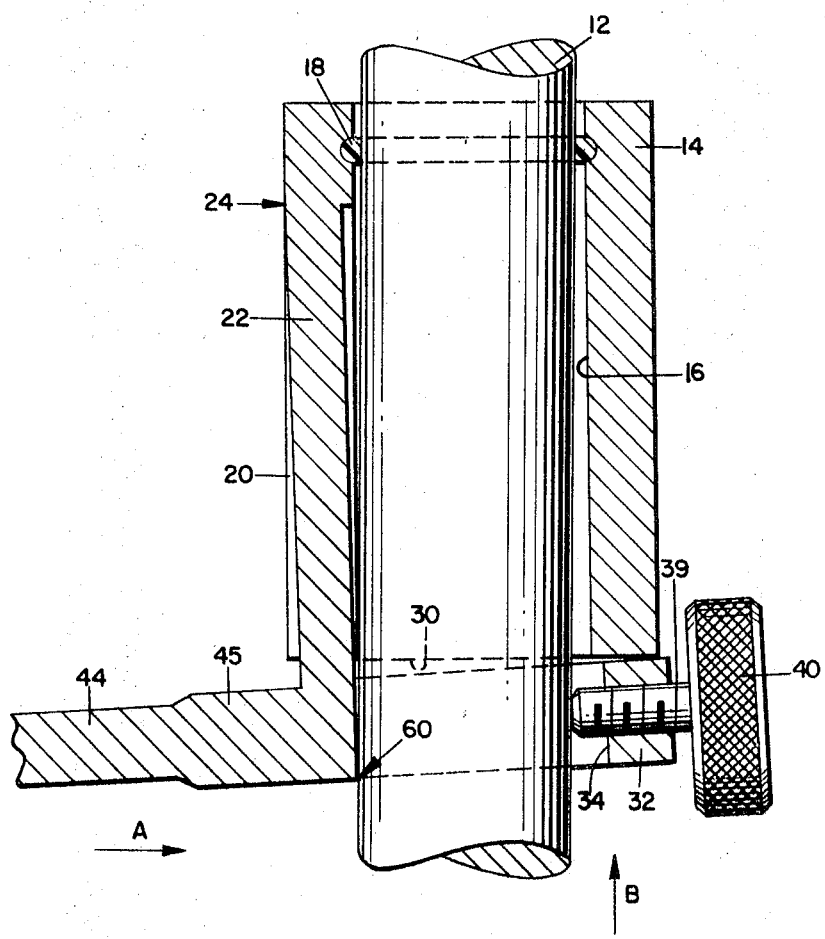
FIG. 7 is an enlarged, fragmentary, cross-sectional view taken longitudinally through the clamping device and showing the relationship of the components in the clamping position.

Continued rotation of the thumbscrew draws ringlike lower portion 32 to the right or in the direction of arrow A in FIG. 7.

Because of the springlike connection afforded by yieldable tongue 22 between the clamping means proper and the ringlike portion, as the thumbscrew is tightened the ringlike portion is caused to cant or tilt, with the side of the ringlike portion at the thumbscrew being drawn upwardly in the direction of arrow B in FIG. 7 until the slot 30 adjacent the thumbscrew is closed and the ringlike portion contacts the lower end of body 14 and contacts the column at a point diametrically opposite the thumbscrew, as at 60 in FIG. 7.

Stem 39 of thumbscrew 40 bears against the column when tightened so as to cause tongue 22 to be brought to bear against the opposite side of the column. Thus, a bearing force is obtained longitudinally of the post for at least the length of the tongue rather than the simple bearing force at the point where stem 39 of the thumbscrew bears against the post.

As thumbscrew 40 is tightened, a pivoting action is exerted on tongue 22 so that the ring swings along an arc so that arm 44 is deflected downwardly relative to the horizontal axis of the body to set up a concommitant movement in indicating device 46.

I claim:
1. Measuring apparatus comprising in combination,
   a. a base,
   b. a column extending upwardly from the base,
   c. a clamping means including a body loosely removably circumscribing the column for vertical adjustment thereon and for angular adjustment about the vertical axis of the column,
   d. the clamping means including a pair of vertically extending slots in the body defining therebetween a yieldable tongue joined to the body adjacent the upper end of the body and a horizontally extending slot in the body defining an annular ring adjacent the lower end of the body and joined to the lower end of the tongue,
   e. screw means threading through the annular ring and bearing on the column for holding the clamping means on the column,
   f. an arm extending outwardly from the ring in parallel relation to the base, whereby appropriate rotation of the screw means motivates the ring along an arc from a pivot point at the junction of the tongue and the body, with the ring and the arm deflecting downwardly relative to the horizontal axis of the body.

2. Measuring apparatus according to claim 1, wherein the screw means and the arm are axially aligned.

3. Measuring apparatus according to claim 1, including an indicating device on the arm.